(12) United States Patent
Nawathe

(10) Patent No.: US 11,487,758 B2
(45) Date of Patent: Nov. 1, 2022

(54) QUERY PROCESSING USING HYBRID INVERTED INDEX OF PREDICATES

(71) Applicant: ADOBE INC., San Jose, CA (US)

(72) Inventor: Sandeep Nawathe, Sunnyvale, CA (US)

(73) Assignee: ADOBE INC., San Jose, CA (US)

(*) Notice: Subject to any disclaimer, the term of this patent is extended or adjusted under 35 U.S.C. 154(b) by 140 days.

(21) Appl. No.: 16/777,412

(22) Filed: Jan. 30, 2020

(65) Prior Publication Data

US 2021/0240706 A1 Aug. 5, 2021

(51) Int. Cl.
| | | |
|---|---|---|
| G06F 16/24 | (2019.01) | |
| G06F 16/2453 | (2019.01) | |
| G06F 16/22 | (2019.01) | |
| G06F 40/284 | (2020.01) | |
| G06F 40/205 | (2020.01) | |
| G06F 16/242 | (2019.01) | |

(52) U.S. Cl.
CPC .... *G06F 16/24534* (2019.01); *G06F 16/2264* (2019.01); *G06F 16/243* (2019.01); *G06F 40/205* (2020.01); *G06F 40/284* (2020.01)

(58) Field of Classification Search
CPC ............. G06F 16/24534; G06F 16/243; G06F 16/2264; G06F 40/284; G06F 40/205
USPC ...................................................... 707/759
See application file for complete search history.

(56) References Cited

U.S. PATENT DOCUMENTS

| | | |
|---|---|---|
| 7,917,501 B2 | 3/2011 | Arends et al. |
| 8,296,748 B2 | 10/2012 | Cheng et al. |
| 8,738,608 B2 | 5/2014 | Pauly |
| 9,110,946 B2 | 8/2015 | Chen et al. |
| 9,378,239 B1 | 6/2016 | Long et al. |
| 9,378,241 B1 | 6/2016 | Shankar et al. |

(Continued)

OTHER PUBLICATIONS

C. Mohan, Don Haderle, Yun Wang, Josephine Cheng, "Single table access using multiple indexes: Optimization, execution, and concurrency control techniques", In Proc. International Conference on Extending Database Technology, pp. 29-43 (Year: 1990).*

(Continued)

*Primary Examiner* — Hosain T Alam
*Assistant Examiner* — Robert F May
(74) *Attorney, Agent, or Firm* — Shook, Hardy & Bacon LLP

(57) ABSTRACT

A query processing system generates and employs a hybrid inverted index of predicates for predicate statement evaluation. The query processing system converts a collection of predicate statements to two parts, a matrix and a set of reduced predicate statements. The query processing system then generates a hybrid inverted index that maps values for variables to predicates from the matrix and the reduced predicate statements that evaluate to true for corresponding values. When querying data, the query processing system performs a lookup on the hybrid inverted index to identify predicates from the matrix and reduced predicate statements that evaluate to true for values of variables for the data. The query processing system identifies predicate statements that evaluate to true by evaluating the matrix and reduced predicate statements using treating predicates identified from the hybrid inverted index as true.

19 Claims, 12 Drawing Sheets

(56) References Cited

U.S. PATENT DOCUMENTS

| | | |
|---|---|---|
| 9,535,963 B1 | 1/2017 | Shankar et al. |
| 2005/0091183 A1 | 4/2005 | Cunningham et al. |
| 2008/0288442 A1 | 11/2008 | Feigenbaum et al. |
| 2008/0306910 A1 | 12/2008 | Singh |
| 2009/0063397 A1* | 3/2009 | Beavin ............... G06F 16/24537 |
| 2011/0016109 A1* | 1/2011 | Vassilvitskii .......... G06Q 30/02 707/E17.084 |
| 2011/0078134 A1* | 3/2011 | Bendel .................... G06F 16/22 707/E17.131 |
| 2011/0213660 A1* | 9/2011 | Fontoura ............ G06Q 30/0254 705/14.52 |
| 2011/0252073 A1 | 10/2011 | Pauly |
| 2012/0054225 A1 | 3/2012 | Marwah et al. |
| 2012/0089594 A1* | 4/2012 | Krishna ............ G06F 16/24544 707/714 |
| 2012/0173517 A1* | 7/2012 | Lang .................... G06F 16/2456 707/E17.014 |
| 2013/0262498 A1 | 10/2013 | Chen et al. |
| 2014/0156587 A1 | 6/2014 | Momtchev et al. |
| 2014/0317115 A1 | 10/2014 | Pauly |
| 2014/0379690 A1* | 12/2014 | Ahmed ............. G06F 16/24544 707/713 |
| 2015/0032763 A1* | 1/2015 | Marwah .............. G06F 16/2453 707/754 |
| 2015/0234888 A1* | 8/2015 | Ahmed ............... G06F 16/2425 707/765 |
| 2015/0356140 A1* | 12/2015 | Demir .................. G06F 16/282 707/765 |
| 2017/0075898 A1 | 3/2017 | Deshpande et al. |
| 2017/0075984 A1 | 3/2017 | Deshpande et al. |
| 2017/0083571 A1 | 3/2017 | Shankar et al. |
| 2018/0285475 A1 | 10/2018 | Grover et al. |
| 2019/0253254 A1 | 8/2019 | Brownlee et al. |
| 2019/0332698 A1 | 10/2019 | Cho et al. |
| 2020/0004736 A1 | 1/2020 | Liu et al. |
| 2020/0134032 A1 | 4/2020 | Lin et al. |
| 2020/0341981 A1* | 10/2020 | Fender ............. G06F 16/24544 |

OTHER PUBLICATIONS

Non-Final Office Action dated Aug. 19, 2021 in U.S. Appl. No. 16/777,399, 18 pages.

Preinterview First Office Action dated Nov. 19, 2021 in U.S. Appl. No. 16/777,405, 6 pages.

Notice of Allowance dated Feb. 2, 2022 in U.S. Appl. No. 16/777,399, 13 pages.

Notice of Allowance dated Jul. 7, 2022 in U.S. Appl. No. 16/777,405, 14 pages.

* cited by examiner

```
foreach d in D do         // for each dimension
  hybridIndex = {}         // map of value -> CSet ≡ {BS, PS}
  foreach row in M do      // M is the Matrix
    foreach pred in M:d do // column d in Matrix M
      values←pred.RHS ∪{Θ,Θ_LOW,Θ_HIGH,ψ}
      foreach v in values do //iterate over all values
        // Note: Utilize predicate operator aware method in Fig. 9
        hybridIndex[v].CSet.BS←row // add row in bitset
      done
    done
  done
  foreach exp in PEs do   // Reduced predicate statements
    foreach pred in exp do
      if pred ∈ d then
        values←pred.RHS ∪{Θ,Θ_LOW,Θ_HIGH,ψ}
        foreach v in values do
          // Note: Utilize predicate operator aware method in Fig. 9
          hybridIndex[v].PS←pred //insert predicate
      endif
    done
  done
  hybridIndex[*].BS←hybridIndex[*].BS ∪ hybridIndex[].BS
  foreach key in hybridIndex.keys() do
    hybridIndex[key].BS = hybridIndex[key].BS ∪ hybridIndex[Φ].BS
    hybridIndex[key].BS = hybridIndex[key].BS ∪ hybridIndex[*].BS
    hybridIndex[key].PS = hybridIndex[key].PS ∪ hybridIndex[*].PS
  done
done
```

*FIG. 8.*

```
R^A                      // Set of all RHS values from P^A
genericIndex = {}    // map of value -> Set{ ^Ap_i, ^Ap_j,… } foreach ^Ap_i in P^A do    // for each predicate in dimension A
    foreach v in ^Ap_i.values() do // for each RHS value of the predicate
       if (^Ap_i.operator = '=') then
           genericIndex[v].add(^Ap_i)
       elseif (^Ap_i.operator = '!=') then
           foreach x in R^A do
               if (x != v) then
                   genericIndex[x].add(^Ap_i)
               endif
           done
       elseif (^Ap_i.operator = '>') then
           foreach x in R^A do
               if (x > v) then
                   genericIndex[x].add(^Ap_i)
               endif
           done
       elseif (^Ap_i.operator = '≥') then
           foreach x in R^A do
               if (x > v) then
                   genericIndex[x].add(^Ap_i)
               endif
           done
           genericIndex[v].add(^Ap_i)
       elseif (^Ap_i.operator = '<') then
           foreach x in R^A do
               if (x < v) then
                   genericIndex[x].add(^Ap_i)
               endif
           done
       elseif (^Ap_i.operator = '≤') then
           foreach x in R^A do
               if (x < v) then
                   genericIndex[x].add(^Ap_i)
               endif
           done
           genericIndex[v].add(^Ap_i)
       endif
   done
done
```

*FIG. 9.*

```
// Step 1. eliminates all pe_i s that can't be satisfied
//         computation is done against Matrix
satisfiableList←PE  // start will all PEs
foreach d in D do  // for each dimension
    hybridIndex←hybridIndices[d]  // access hybridIndex for the dimension
    matchList←{}  // match for dimension d
    foreach v in AS^d do
        matchList←matchList ∪ hybridIndex[v].BS  // bitwise OR
    done
    satisfiableList←satisfiableList ∩ matchList  // bitwise AND
done
AS^CJ←satisfiableList   // Additional assignments
AS←AS ∪ AS^CJ  //
//Step 2 evaluates reduced predicate statements
satisfied←defaultTrue// Set of satisfied pe_i s
// remove unsatisfiable pe_i s
satisfied←satisfied ∩ satisfiableList  // bitwise AND
foreach d in D do
    hybridIndex←hybridIndices[d]  // access
    foreach v in AS^d do
        foreach p/r in (hybridIndex[v].PS ∩ satisfiableList) do
            propagate p in the bit-tree for r  //
            if r is satisfied then  // r[0] == true (root node)
                satisfied←r
            else
                assert (r ∉ satisfied)  // remove r from satisfied
            endif
        done
done
return satisfied
```

FIG. 11.

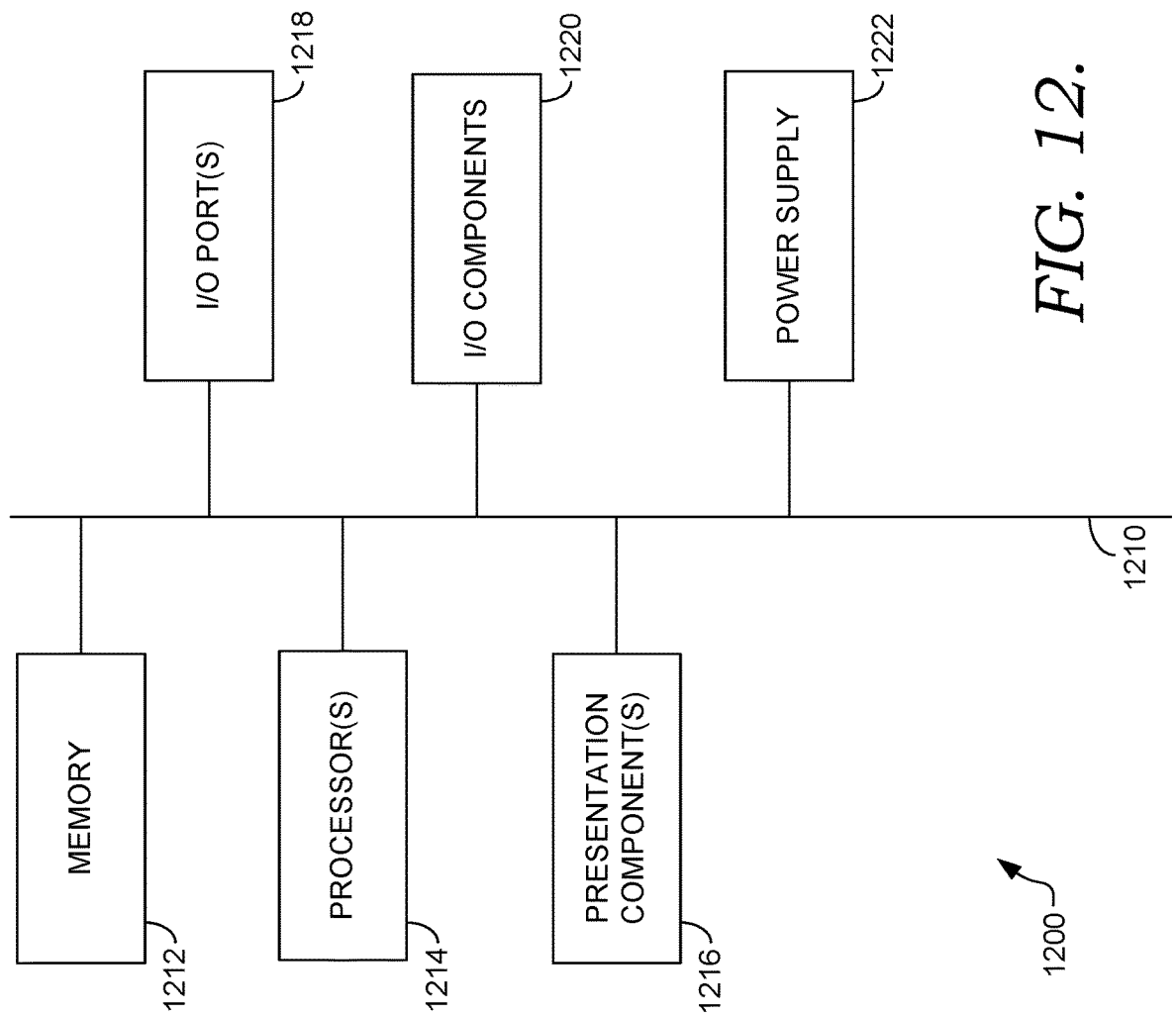

QUERY PROCESSING USING HYBRID INVERTED INDEX OF PREDICATES

CROSS-REFERENCE TO RELATED APPLICATIONS

This patent application is related by subject matter to: U.S. patent application No. 16/777,405, titled QUERY PROCESSING USING MATRIX AND REDUCED PREDICATE STATEMENTS, filed on even date herewith; and U.S. patent application No. 16/777,399, titled QUERY PROCESSING USING INVERTED INDEX OF PREDICATE STATEMENTS, filed on even date herewith. Each of the aforementioned applications is incorporated herein by reference in its entirety.

BACKGROUND

As the amount of available digital information continues to grow exponentially, search techniques have become paramount for quickly and efficiently querying information. Traditionally, search indexes have been used to index and retrieve information. Search indexes are often comprised of posting lists (sometimes called an inverted index). A posting list may store, for instance, data identifying a list of the documents containing a particular term. When a search query is received, the search index is queried to identify documents containing terms identified from the search query. This approach of using posting lists has been successful in particular areas, such as Internet webpages, where data is relatively stable (i.e., smaller changes to webpages over longer periods of time). However, areas where the information is less stable pose challenges to the use of such posting listings as the indexed information changes significantly over shorter periods of time, making it difficult to update and maintain the posting lists.

SUMMARY

Embodiments of the present invention relate to, among other things, a query processing system that employs a hybrid inverted index of predicates for predicate statement evaluation. The query processing system applies transforms to convert a collection of predicate statements to two parts, a matrix and a set of reduced predicate statements. The query processing system then generates a hybrid inverted index mapping values for variables to predicates from the matrix and the reduced predicate statements that evaluate to true for corresponding values. When querying data, the query processing system performs a lookup on the hybrid inverted index to identify predicates from the matrix and reduced predicate statements that evaluate to true for values based on the data. The query processing system identifies candidate predicate statements that may be satisfied for the data from the matrix by treating matrix predicates identified from the hybrid inverted index as true. The query processing system also evaluates reduced predicate statements for those candidate predicate statements by treating reduced predicate statement predicates identified from the hybrid inverted index as true.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 8 provides pseudocode for an indexing method in accordance with some implementations of the present disclosure;

FIG. 9 provides further pseudocode for an indexing method in accordance with some implementations of the present disclosure;

FIG. 11 provides pseudocode for an evaluation method in accordance with some implementations of the present disclosure; and FIG. 12 is a block diagram of an exemplary computing environment suitable for use in implementations of the present disclosure.

DETAILED DESCRIPTION

Definitions

Figure 1:
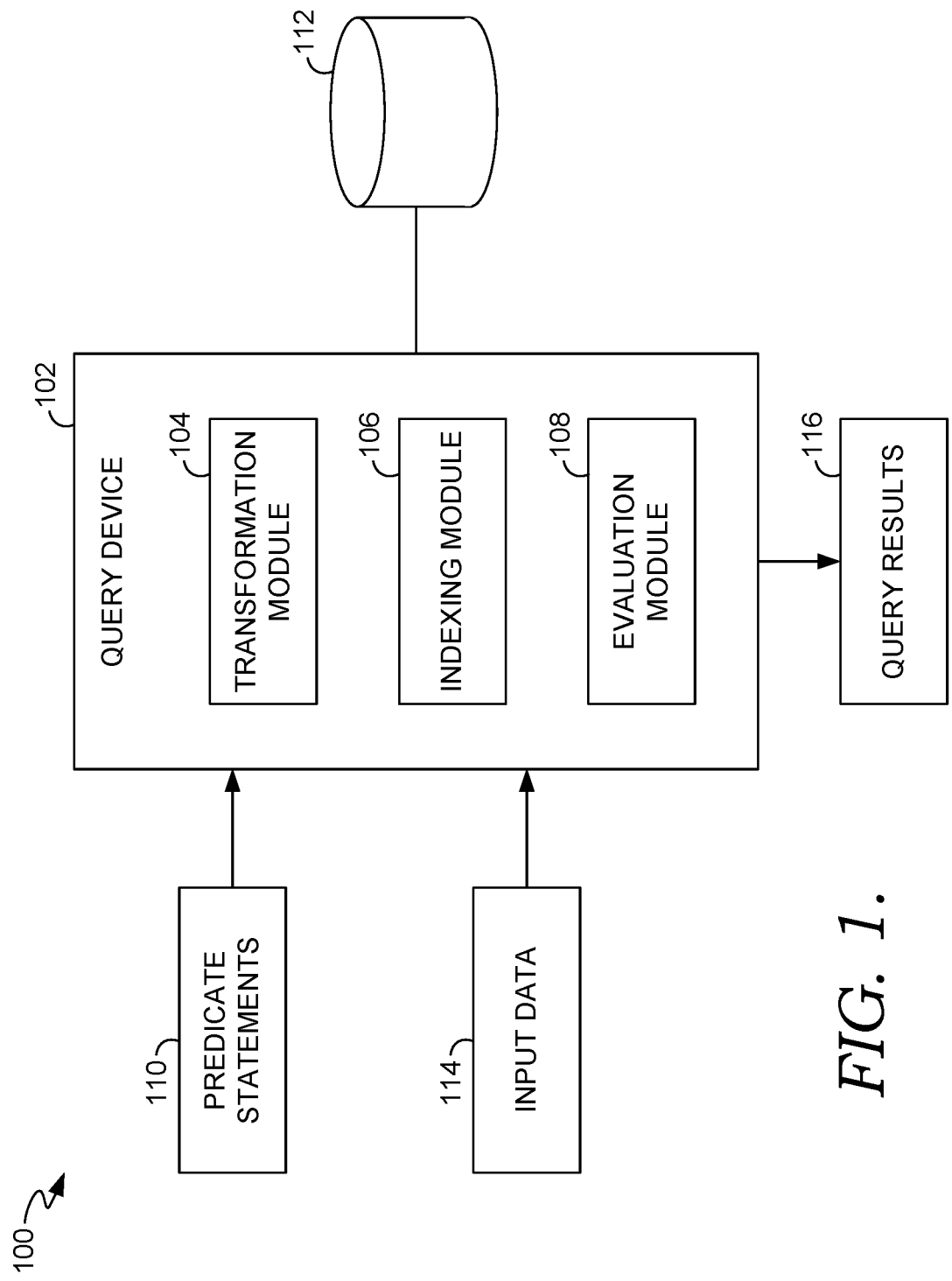
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "predicate" refers to a condition to be evaluated as either "true" when the condition is satisfied or "false" when the condition is not satisfied. A predicate can generally be represented as: LHS OPERATOR RHS, where LHS refers to a left-hand side that is a "variable," RHS refers to a right-hand side that is a "predicate value" that can be a constant or a predicate value for the variable, and OPERATOR refers a "predicate operator" for comparing the LHS and RHS. Predicator operators includes: $<$, $<=$, $=$, $!=$, $>$, and $>=$. Shown below are a few examples of predicates to illustrate:

1) $r<=10$, where "r" is a variable, $<=$ is an operator, and 10 is a predicate value that is a constant.

2) state='CA', where "state" is a variable, = is an operator, and 'CA' is a predicate value that is a constant.

3) x>y, where "x" is a variable, > is an operator, and "y" is a predicate value that is a variable.

A "predicate statement" joins individual predicates using logical operators, which may be Boolean operators, such as AND, OR, and NOT. Provided below is an example of a predicate statement combining the above predicates using logical operators (parenthesis are included to assist in readability):

((r<=10) OR (x>y)) AND (state='CA')

As used herein, a "predicate statement identifier" refers to an identifier assigned to a predicate statement to uniquely identify the predicate statement in a collection of predicate statements. For instance, the predicate statement identifier assigned to each predicate statement from a collection of predicate statements can be a sequential number.

A "predicate statement tree" or "tree" is a tree expression of a predicate statement in which each leaf node corresponds with a predicate from the predicate statement and each intermediate node corresponds with a logical operator from the predicate statement.

A "node identifier" refers to an identifier assigned to each predicate and each logical operator in a predicate statement.

A "predicate identifier" refers to an identifier that uniquely identifies a predicate in a collection of predicate statements. In some configurations, a predicate identifier used to uniquely identify a predicate can be a combination of a predicate statement identifier for the predicate statement containing the predicate and the node identifier assigned to the predicate.

As used herein, a "bit string" refers to a collection of bits each having a bit position in the bit string in which the bit value for each bit position can be zero or one. For example, a bit string of [0101] has four bit positions, in which each of the first and third bit positions has a bit value of zero and each of the second and fourth bit positions has a bit value of one.

As used herein, "conjunctive normal form" (CNF) for a predicate statement indicates that the predicate statement is expressed as a conjunction (i.e., logical AND) of several predicate subexpressions where each predicate subexpression is devoid of any conjunction operator. Below is an example of a predicate statement in CNF:

(r<=10 OR x<y) AND (state='CA')

In this example, the predicate statement includes two predicate subexpressions: (r<=10 OR x<y) and (state='CA'), and each subexpression is devoid of any conjunction operator.

As used herein, "disjunctive normal form" (DNF) for a predicate statement indicates that the predicate statement is expressed as a disjunction (i.e., logical OR) of several predicate subexpressions where each predicate subexpression is devoid of any disjunction operator. Below is an example of a predicate statement in DNF:

(a<10 AND score>0.9) OR (state='CA' AND gender='Male')

In this example, the predicate statement includes two predicate subexpressions: (a<10 AND score>0.9) and (state='CA' AND gender='Male'), and each subexpression is devoid of any disjunction operator.

Overview

Query processing for many domains is often accomplished by conventional query processing systems expressing queries using a set of predicate statements and evaluating the predicate statements against data being queried. Each predicate statement includes one or more predicates, and each predicate represents a condition to be evaluated. The goal of such query processing systems is to provide evaluations that are accurate, complete, and performed in a short period of time (e.g., a few milliseconds). Although each predicate statement can be sequentially evaluated for a truth value, when a large number of predicate statements are involved, the evaluation process can be both resource and time intensive for the query processing system. Some approaches, such as the RETE algorithm, have been developed to facilitate the evaluation process but still include drawbacks in resource requirements (including processing and memory requirements) and the time required for the query processing systems to process the queries.

Embodiments of the present invention are directed to a query processing system that addresses these challenges by providing a solution that efficiently evaluates predicate statements for query processing. At a high level, the query processing system builds hybrid inverted indexes of predicates to be evaluated. While conventional search systems typically employ inverted indexes storing data to be queried, the query processing system described herein forms hybrid inverted indexes of predicates (i.e., query representations) and employs the hybrid inverted indexes when querying data.

In accordance with the technology described herein, a collection of predicate statements to be evaluated are processed to generate one or more hybrid inverted indexes for predicates from the predicate statements. Given the collection of predicate statements, the query processing system applies one or more transforms to convert the predicates statements into two parts: (1) a matrix, and (2) a set of reduced predicate statements. The transforms applied are idempotent in that results of evaluation of data using the matrix and reduced predicate statements is identical to results of evaluation of the data using the original predicate statements.

The transforms applied to predicate statements operate to extract conjunctive predicates (when the predicate statements are in CNF) or disjunctive predicates (when the predicate statements are in DNF) from the predicate statements to form the reduced predicate statements. The matrix is generated by including a row for each predicate statement and a column for each variable included in the predicate statements. Each conjunctive/disjunctive predicate extracted from the predicate statements is added to the matrix in the row for the predicate statement from which the conjunctive/disjunctive predicate was extracted and in the column for the variable included in the conjunctive/disjunctive predicate.

The data processing system generates the hybrid inverted index by mapping, for each variable, predicate values to two sets of predicates. For a given value for a variable, the first set includes predicates from the matrix that evaluate to true for that value, and the second set includes predicates from reduced predicate statements that evaluate to true for that value.

The query processing system employs the hybrid inverted index to evaluate predicate statements against data being queried. Based on the data, values for variables are identified and used to look up predicates that evaluate to true for those values. The query processing system identifies from the hybrid inverted index predicates from the matrix that evaluate to true for the data. Treating the identified predicates as true in the matrix, the query processing system identifies which predicate statements can be satisfied for the data from the matrix. These are considered as candidate predicate statements. The query processing system also identifies from the hybrid inverted index predicates from the reduced predicate statements that evaluated to true for the data. The query processing system evaluates the reduced predicate statements for the candidate predicate statements by treating the identified predicates as true in those reduced predicate statements. For each reduced predicate statement that evaluates to true, the corresponding predicate statement is marked as true, thereby providing a result set of predicate statements that evaluate to true for the data.

The query processing system described herein provides a number of advantages over conventional systems. Due to the regular structure of the matrix, evaluation to identify candidate predicate statements from the matrix can be performed very quickly and efficiently. For instance, in the case of conjunctive predicates, the process is a simple ANDing of the conjunctive predicates. Additionally, the reduced predicate statements have lower complexity as compared to the original predicate statements, making evaluation of those reduced predicate statements quicker and more efficient. Further, reduced predicate statements are evaluated only for candidate predicate statements identified from the matrix. This is in contrast to conventional systems in which each predicate statement is evaluated. Accordingly, the query processing system provides for evaluation of predicate statements that is not only faster than conventional systems but also more efficient, thereby reducing computing resources requirements to perform query processing.

The use of hybrid inverted indexes of predicates also increases efficiency in several ways. For instance, hybrid inverted indexes of predicate statements allow the query processing system to avoid sequential evaluation of predicates and avoid evaluation of predicates when input data does not affect the truth state of predicates. In some configurations, the query processing system generates inverted indexes that consider the predicate value(s) and operator for each predicate, thereby allowing a single lookup in a hybrid inverted index to identify all matching predicates for given input data with a particular value for a variable. In configurations in which reduced predicate statements are represented as bit strings, each reduced predicate statement can be stored using very few bits, which is highly memory efficient, and allows for easy cloning and state management during evaluation to further improve efficiency. Additionally, the query processing system can run the reduced predicate statement evaluation as bit wise AND, OR, and NOT operations on bit strings, which helps modern processors and compilers to optimize for performance.

Query System Using Hybrid Inverted Index of Predicates

With reference now to the drawings, FIG. 1 is a block diagram illustrating an exemplary system 100 for querying data using hybrid inverted indexes built from predicates in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes query device 102, which includes a transformation module 104, an indexing module 106, and an evaluation module 108. The query device 102 shown in FIG. 1 can comprise a computer device, such as the computing device 1200 of FIG. 12, discussed below. While the query device 102 is shown as a single device in FIG. 1, it should be understood that the query device 102 may comprise multiple devices cooperating in a distributed environment. For instance, the query device 102 could be provided by multiple server devices collectively providing the functionality of the query device 102 as described herein. Additionally, other components not shown may also be included within the network environment. When multiple devices are employed, the devices can communicate via a network (not shown), which may include, without limitation, one or more local area networks (LANs) and/or wide area networks (WANs). Such networking environments are commonplace in offices, enterprise-wide computer networks, intranets, and the Internet. It should be understood that any number of devices and networks may be employed within the system 100 within the scope of the present invention.

At a high level, the query device 102 generally operates to build a hybrid inverted index from predicate statements and employs the inverted index when querying input data. As shown in FIG. 1, the query device 102 includes a transformation module 104, indexing module 106, and evaluation module 108.

The transformation module 104 operates to transform the collection of predicate statements 110 into a matrix and reduced predicate statement form. One approach for the transformation module 104 to transform predicate statements is described in more detail below with reference to FIG. 5. Initially, the transformation module 104 may perform one or more preprocessing operations on the predicate statements 110. For instance, the transformation module 104 may convert at least a portion of the predications statements 108 into CNF or DNF such that each predicate statement is in CNF or DNF.

The preprocessing operations may further include assigning a predicate statement identifier to each predicate statement from the collection of predicate statements 110. Additionally, for each predicate statement, the transformation module 104 may assign a node identifier to each predicate and each logical operator. In some configurations, this may include representing the predicate statement as tree with each leaf node corresponding to a predicate and each intermediate node corresponding to a logical operator. The edges between nodes in the tree are structured based on the relationships among predicates and logical operators in the predicate statement. A combination of a predicate statement identifier and node identifier can be used to uniquely identify predicates and logical operators among the collection of predicate statements 110. For instance, a predicate identifier uniquely identifying a predicate can be based on a combination of a predicate statement identifier for the predicate statement in which the predicate is located and a node identifier for the predicate.

Figure 2:
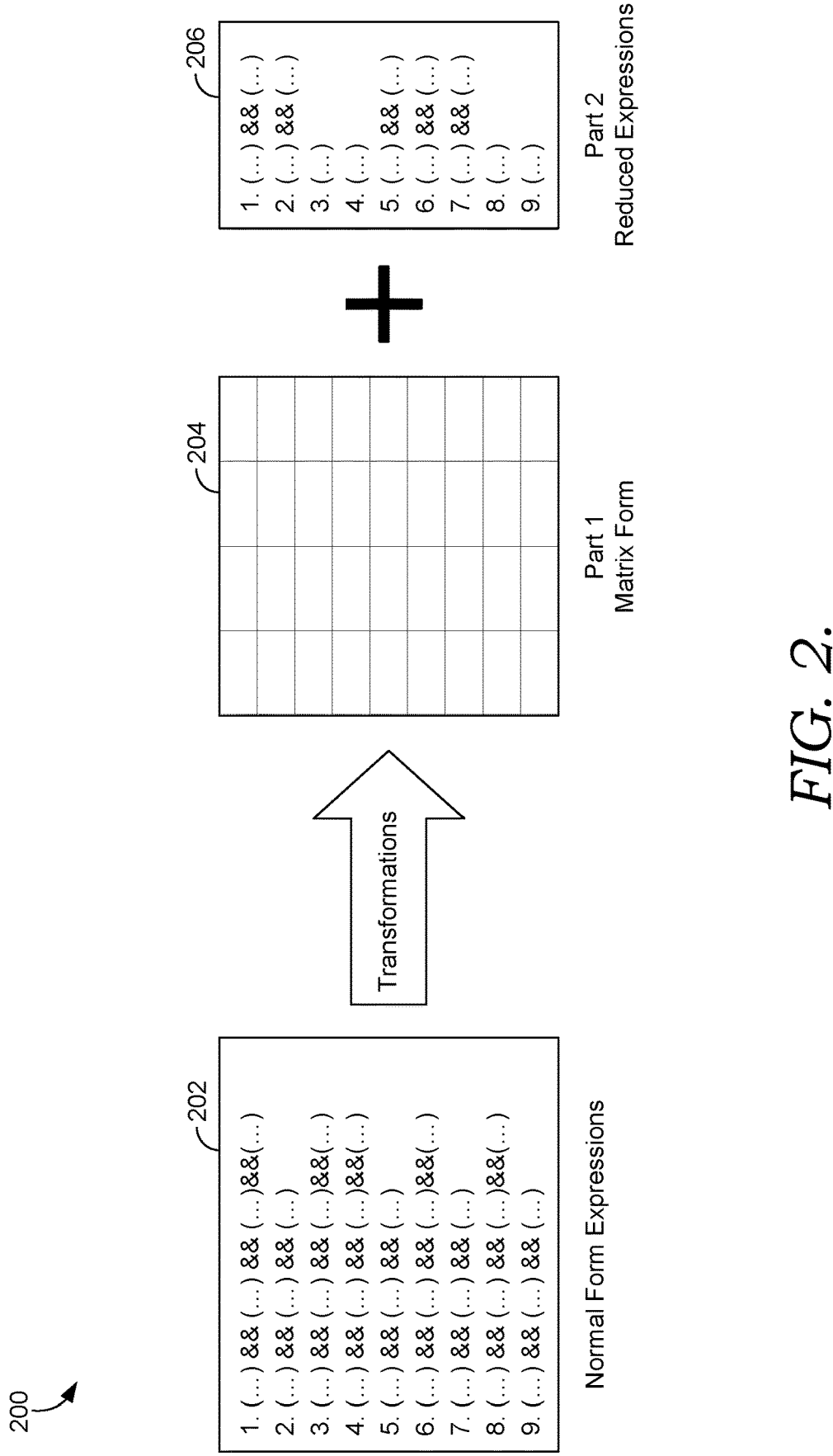
FIG. 2 is a block diagram showing transformation of a collection of predicate statements to a matrix and reduced predicate statement form in accordance with some implementations of the present disclosure.

After any preprocessing is performed, the transformation module 104 performs one or more idempotent transformations on the predicate statements 110 to convert the predicate statements to two parts: a first part comprising a matrix and a second part comprising a reduced predicate statement for each predicate statement from the collection of predicate statements. This transformation is illustrated in FIG. 2, in which a collection of predicate statements 202 is transformed into a matrix 204 and a set of reduced predicate statements 206.

In instances in which the predicate statements 110 are in CNF, the transformation module 104 applies transformations to generate a matrix containing conjunctive predicates from each predicate statement. Each row of the matrix corresponds with a predicate statement and each column corresponds with a variable. Each conjunctive predicate from a predicate statement is added to the row for the predicate statement and the column based on the variable of the predicate statement. Additionally, the transformations provide a reduced predicate statement for each predicate statement by removing any conjunctive predicates added to the matrix from a predicate statement. In instances in which the predicate statements are in DNF, the transformation module 104 applies transformations to generate a matrix containing disjunctive predicates from each predicate statement and reduced predicate statements in which disjunctive predicates added to the matrix have been removed from the predicate statements.

The indexing module 106 operates to build one or more hybrid inverted indexes of predicates from the matrix and the reduced predicate statements. One approach for the indexing module 106 to generate a hybrid inverted index of predicates is described in detail below with reference to FIG. 7. The hybrid inverted index built by the indexing module maps predicates that evaluate to true for particular values for variables. As such, the hybrid inverted index provides a mechanism for efficient evaluation of predicate statements by: avoiding sequential evaluation of predicates, avoiding evaluation of predicates when input data does not affect the truth state of the predicates, and allowing a single lookup to find all matching predicates for a given value for a variable for input data being queried.

In some configurations, the indexing module 106 the hybrid inverted index for each variable by identifying predicates from the matrix and reduced predicate statements that contain each variable. For a given variable, the predicate values corresponding to that variable are identified from the predicates containing the given variable. In some instances, the range of values from the predicates containing the variable are augmented to account for input data that that has values for the variable outside the range of values.

The indexing module 106 builds the hybrid inverted index for a given variable using the ranges of values and augmented values for that variable. The hybrid inverted index for a given variable is generated with two sets of predicates for each value, the two sets collectively referred to herein as a composite set (Cset). The first set, referred to herein as a bitset (BS), identifies each predicate from the matrix that evaluates to true for the given value for the corresponding variable. In some configurations, the bitset is a bitstring in which each bit position corresponds with a row from the matrix. A bit for a particular bit position is set to one if the predicate in the row corresponding with that bit position evaluates to true for that value. The second set, referred to herein as a predicate set (PS), identifies each predicate from the reduced predicate statements that evaluates to true for the given value for the corresponding variable. Each predicate can be identified in the hybrid inverted index using a predicate identifier, which may be a combination of a predicate statement identifier and node identifier. In some configurations, the predicates in predicate set may be ordered based on their predicate identifiers.

Figure 3:
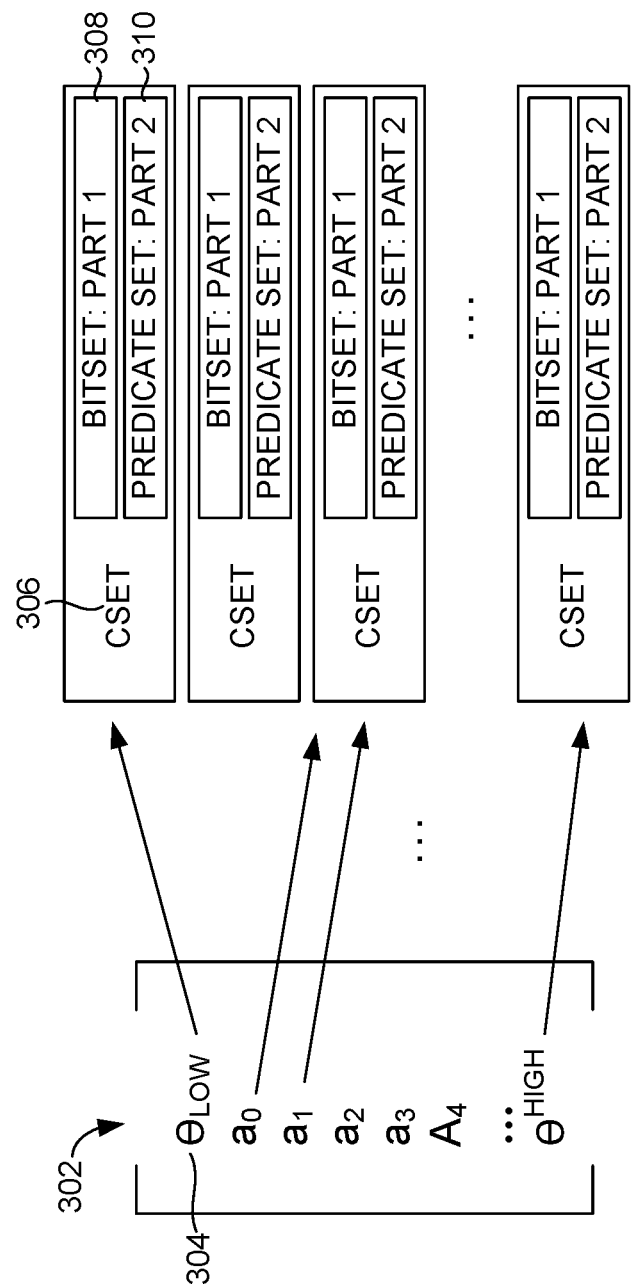
FIG. 3 is a diagram providing an example of a hybrid inverted index in accordance with some implementations of the present disclosure.

This is illustrated in FIG. 3, which provides an example of a simplified hybrid inverted index for a variable. As shown in FIG. 3, a composite set is provided for each value from the range of values 302 for the variable. For instance, the composite set 306 is provided for the first value 304 from the range of values 302. The composite set 306 includes bitset 308 and predicate set 310. Bitset 308 identifies each predicate from the matrix that evaluates to true for the corresponding value 304. Predicate set 310 identifies each predicate from the reduced predicate statements that evaluate to true for the corresponding value 304.

This process of indexing predicates is performed for each variable contained in predicates from the matrix and reduced predicate statements. In some configurations, a separate inverted index is generated for each variable. Additionally, the bitset and predicate set for variables may be stored separately from one another in further configurations. The inverted index(es) is(are) stored in the date store 112, for use in evaluating predicate statements for input data. The inverted index can use r-b tree as its data structure. However, it should be understood by one skilled in the art that other types of data structures may be employed.

The evaluation module 108 employs the hybrid inverted index generated by the indexing module 106 to evaluate predicate statements for input data 114 in order to provide query results 116. One approach for the evaluation module 108 to evaluate predicate statements for input data is described in detail below with reference to FIG. 10.

In accordance with some configurations, the evaluation module 106 first employs the matrix to identify candidate predicate statements that can be satisfied for the input data. More particularly, a lookup is performed on the bitsets in the hybrid inverted index based on values for variables given the input data 114. Based on this lookup, predicates in the matrix that evaluate to true given the input data 114 are identified. A truth value in the matrix can be toggled to true for each identified predicate, and predicate statements that are satisfied based on the matrix are identified as candidates for further evaluation. For instance, in the case in which the predicate statements are placed in CNF, a predicate statement is satisfied in a matrix if each variable is marked as true. Predicate statements that are not satisfied in the matrix are not further evaluated.

The evaluation module 108 evaluates the reduced predicate statement for each candidate predicate statement identified from the matrix. A lookup is performed on the predicate sets in the hybrid inverted index based on values for variables given the input data 114. Based on this lookup, predicates in the reduced predicate statements for the candidate predicate statements that evaluate to true given the input data 114 are identified. A truth value in each reduced predicate statement being evaluated can be toggled to true, and a determination is made regarding which reduced predicate statements evaluate to true. For each reduced predicate statement that evaluates to true, the corresponding predicate statement is marked as true, thereby providing a result set of predicate statements that evaluate to true for the input data 114, and query results 116 are provided based on this evaluation process.

Generating Hybrid Inverted Index

Figure 4:
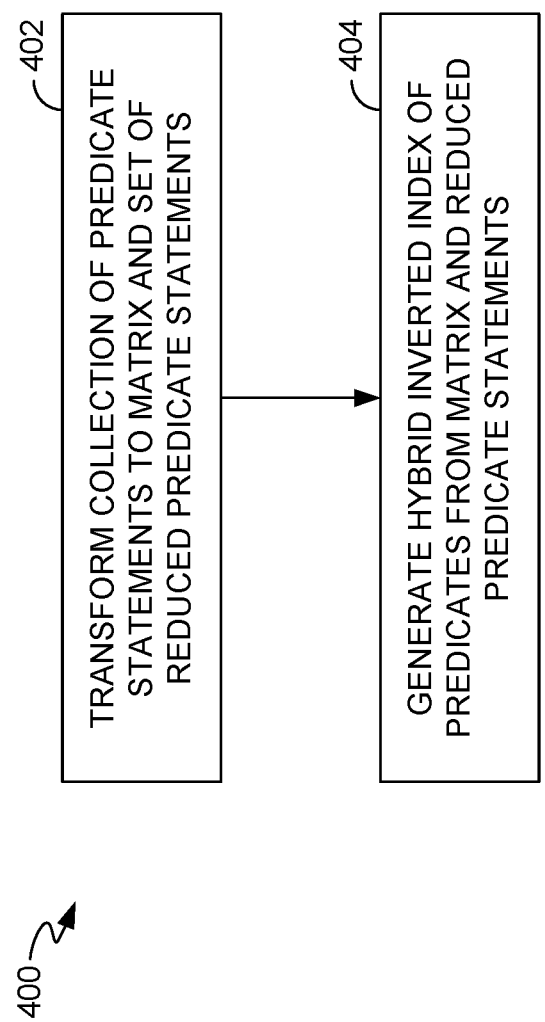
FIG. 4 is a flow diagram showing a method for rating a hybrid inverted index of predicates for a collection of predicate statements in accordance with some implementations of the present disclosure.

With reference now to FIG. 4, a flow diagram is provided that illustrates an overall method 400 for generating a hybrid inverted index of predicates for a collection of predicate statements. The method 400 may be performed, for instance, by the query device 102 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, one or more transforms are applied to convert the collection of predicate statements to two parts: a matrix and a set of reduced predicate statements. One approach for transforming a collection of predicate statements to a matrix and reduced predicate statement form is described below with reference to FIG. 5. After converting the collection of predicate statements, a hybrid inverted index is generated with predicates from the matrix and reduced predicate statements, as shown at block 404. On approach for generating a hybrid inverted index is described below with reference to FIG. 7.

Figure 5:
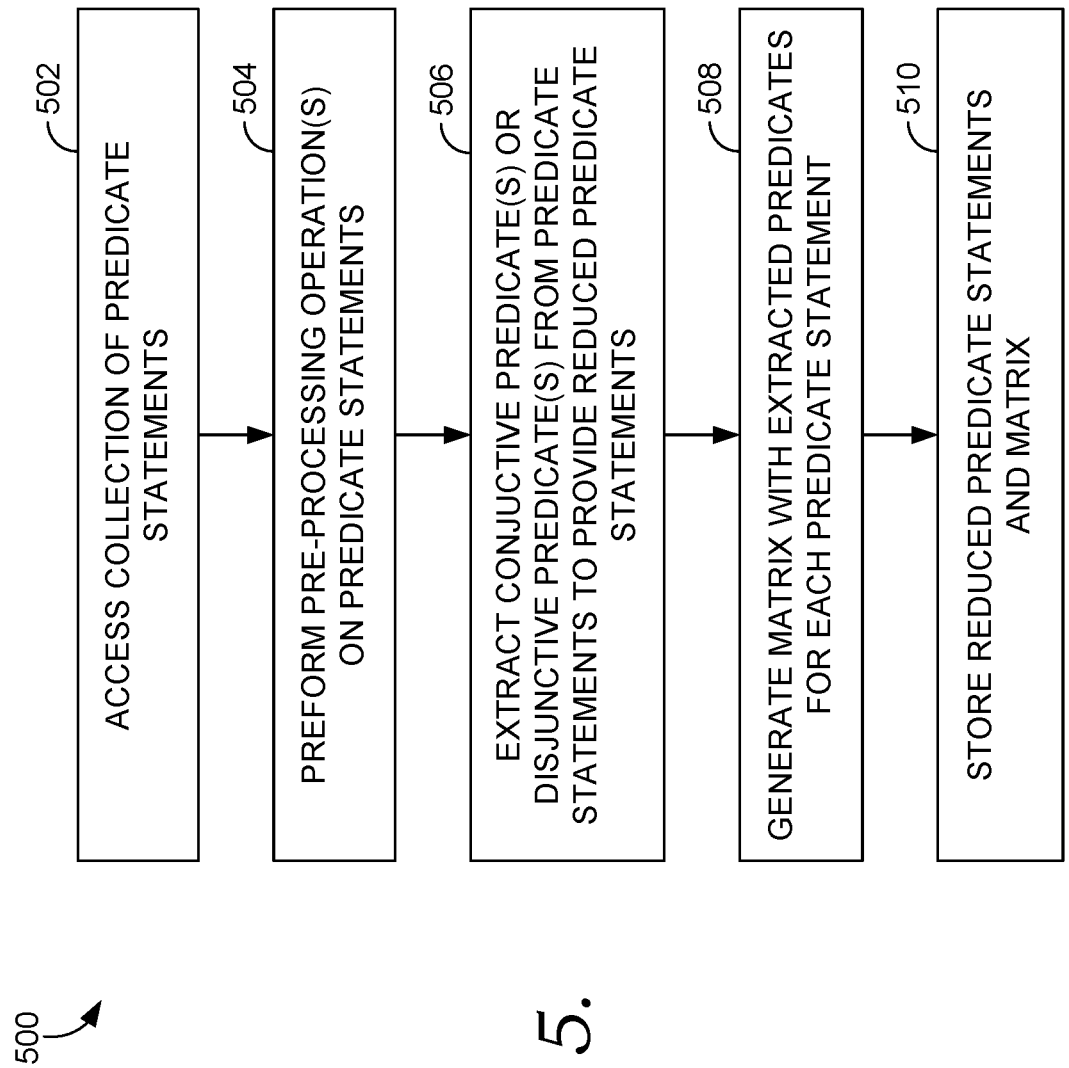
FIG. 5 is a flow diagram showing a method for transforming a collection of predicate statements in accordance with some implementations of the present disclosure.

Turning now to FIG. 5, a flow diagram is provided that illustrates a method 500 for transforming a collection of predicate statements. The method 500 may be performed, for instance, by the transformation module 104 of FIG. 1. The method 500 may be performed for each predicate statement in a collection of predicate statements to be evaluated. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, a collection of predicate statements are accessed. The collection of predicate statements generally comprises expressions that are used for querying data. The predicate statements can comprise multiple predicates, for instance, of the form (A OP $a_1$) where, OP$\in\{=, \neq, <, \leq, >, \geq, =\sim\}$ and A is the variable which may take values $a_1, a_2 \ldots$ from the range of predicate values corresponding to the predicate A. This domain may be referred to herein as the dimension $d^A$ of the attribute A, and D can be used to denote the set of all dimensions such that, D=$\{d^A, d^B, d^C \ldots\}$. $pe_i$ is used to denote a single predicate statement, and PE is used to denote the set of all predicate statements such that, PE=$\{pe_1, pe_2, \ldots\}$. The range of values (RHS of a predicate) used by a $pe_i$ for a dimension $d^A$ is denoted as $R^A$. When evaluating predicate statements, the predicate evaluation function for predicate A under assignment of a single value $a_i$ is denoted as A.eval($a_i$). The function returns either true or false.

One or more preprocessing operations are performed on the collection of predicate statements, as shown at block 504. For instance, the one or more preprocessing operations may include converting predicate statements to CNF or DNF. Various configurations of the present technology operate on the collection of predicate statements with all predicate statements either in CNF or DNF. In some instances, some or all of the predicate statements in the collection of predicate statements may not be in this form. Accordingly, in such instances, at least a portion of the predicate statements are converted to CNF or DNF such at all predicate statements are in CNF of DNF. The process may employ any known algorithm to convert a set of arbitrary predicate statements to either CNF or DNF.

The preprocessing operations may also include assigning a predicate statement identifier to each predicate statement. This allows each predicate statement to be uniquely identified using its predicate statement identifier. In some configurations, each predicate statement is assigned a sequential number as its predicate statement identifier. However, it should be understood that other approaches for assigning predicate statement identifiers to predicates statements may be employed within the scope of the technology described herein.

The preprocessing operations may further include representing each predicate statement is represented as a tree. To represent a predicate statement as a tree, each predicate from the predicate statement is represented as a leaf node, and each logical operator from the predicate is represented as an intermediate node. In some configurations, predicate operators that are negations of the type '!=' are converted to NOT and '='. This eliminates negations from leaf nodes. Relationships between the nodes in the tree are based on the relationship of the operators and predicates within the predicate statement.

Each node in the predicate statement may also be assigned a node identifier. In some configurations, the nodes of the tree are numbered using a depth first walk of the tree. This may include sequentially assigning consecutive numbers to each node. However, it should be understood that any other number scheme may be used within the scope of the technology described herein. The node identifier for a predicate serves to uniquely identify each predicate within that predicate statement. Each predicate can be uniquely identified within a collection of predicate statements as a combination of the predicate statement identifier for the predicate statement of the predicate and the predicate identifier for the predicate. Thus, a combination of a predicate statement identifier and node identifier serve as a predicate identifier to uniquely identify a predicate within a collection of predicate statements.

Figure 6:
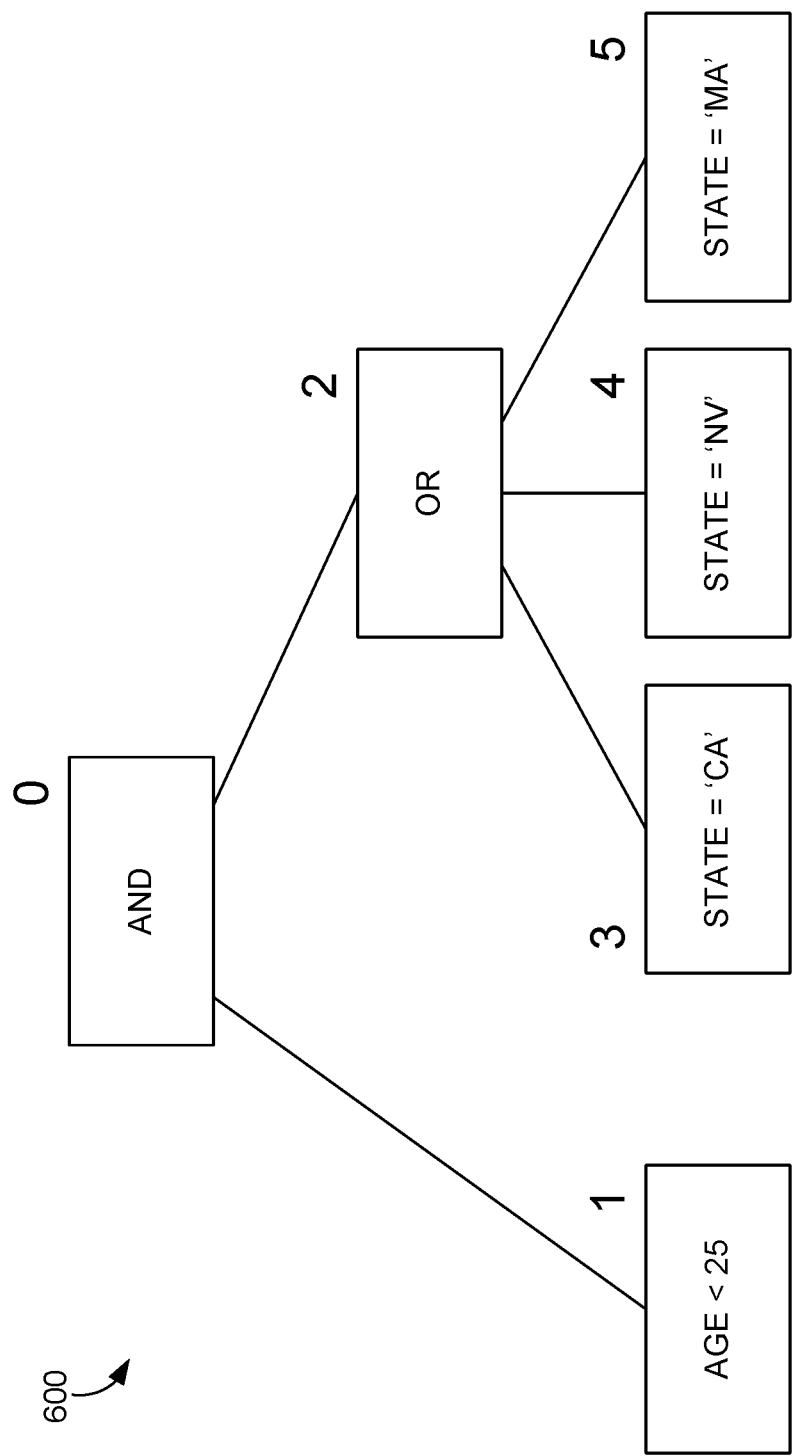
FIG. 6 is a diagram showing an example of a tree generated from a predicate statement.

FIG. 6 provides an example of a tree 600 generated from the predicate statement, which is in CNF:

Example pe: (age<25) AND (state='CA' OR state='NV' OR state='MA')

As can be seen in FIG. 6, each predicate from this example predicate statement is represented as a leaf node in the tree 600 and each logical operator is represented as an intermediate node in the tree 600, with the relationships among the nodes based on the relationships among the predicate statements and logical operators in the predicate statement. As also shown in FIG. 6, each node has been assigned a node identifier using a depth first walk of the tree using consecutive numbers and starting with zero.

Returning to FIG. 5, for each predicate statement, one or more conjunctive predicates or one or more disjunctive predicates are extracted from the predicate statement to provide a reduced predicate statements, as shown at block 506. In instances in which the predicate statements are in CNF, conjunctive predicates are extracted. In instances in which the predicate statements are in DNF, disjunctive predicates are extracted. A predicate is identified as a conjunctive predicate in a predicate statement if none of the ancestors of the predicate in the tree expression for the predicate statement are a disjunction. In the example predicate statement used to generate the tree 500 of FIG. 5, the predicate with the variable "age" is a conjunctive predicate, while the predicates with the variable "state" are not conjunctive predicates. Conversely, a predicate is identified as a disjunctive predicate in a predicate statement if none of the ancestors of the predicate in the tree expression for the predicate statement are a conjunction.

A matrix is generated that includes, for each predicate statement, the one or more conjunctive predicates statements or the one or more disjunctive predicates extracted from the predicate statement, as shown at block 508. The matrix may comprise a simple tabular structure that is initialized with one row for each predicate statements and one column for each unique variable found in the collection of predicate statements. As shown at block 510, the reduced predicate statements and matrix are stored on one or more computer storage media, such that they can be used to evaluation the predicate statements for querying data.

Any number of transforms may be applied to each predicate statement in order to extract conjunctive predicates or disjunctive predicates to generate the matrix and reduced predicate statements. The transforms may be idempotent, such that evaluation of the matrix and reduced predicate statement form provide identical results to the evaluation of the original predicate statements. Below are examples of transforms that may be applied to predicate statements in CNF. While the examples below focus on predicate statements in CNF, similar transforms can be applied to predicate statements in DNF. It should be understood the transforms described below are provided by way of example only and not limitation. None, some, or all of the transforms described herein may be used in various configurations, while other transforms not described may also be employed. Any and all variations are contemplated to be within the scope of the technology described herein.

Transform 1:

If a single subexpression within CNF has multiple disjunctions that belong to a common variable, then the disjunctions of the common variable are consolidated as a single predicate and disjunctions are removed. In the Example pe used above to generate the tree 500 of FIG. 5, the second clause has multiple disjunctions with same variable "state." This is replaced by a single predicate as shown below:

(state='CA' OR state='NV' OR state='MA')→(state=['CA', 'NV', 'MA']

Thus, the Example pe transforms to:

(age<25) AND state=['CA', 'NV', 'MA'])

If the result of this transform makes the transformed predicate a conjunctive predicate, then it is marked as a conjunctive predicate. In the above example, both the predicate with the "age" variable and the predicate with the "state" variable are conjunctive predicates.

Transform 2:

If a CNF has subclauses that are simple predicates of a common variable and use the inequality operator, then the simple predicates of the common variable are consolidated as a single predicate with the inequality operator. By way of example to illustrate:

(age>35 AND country !='CANADA' AND country !='USA')→

(age>35 AND country !=['CANADA', 'USA'])

If the result of this transform makes the transformed predicate a conjunctive predicate, then it is marked as a conjunctive predicate. In the above example, both the predicate with the "age" variable and the predicate with the "country" variable are conjunctive predicates.

Transform 3:

If a given predicate statement $pe_i$ does not have any conjunctive predicate for a given variable, then the predicate statement $pe_i$ is augmented with a conjunctive predicate (attribute=Ø), where Ø is a phantom value that is considered always present during evaluation such that (attribute=Ø) is always true. The newly added predicate is marked as a conjunctive predicate. For example, take the following predicate statement:

$pe_i$: (A=$a_1$) AND (B=$b_1$ OR C=$c_1$)

The above example predicate statement $pe_i$ does not have conjunctive predicates for variables B and C. Therefore, the predicate statement $pe_i$ is transformed as follows:

$pe_i$: (A=$a_1$) AND (B=$b_1$ OR C=$c_1$) AND (B=Ø) AND (C=Ø)

As a result of transforms 1, 2, and 3 each predicate statement has at least one conjunctive predicate in each dimension.

Transform 4:

For each variable of a predicate statement, a most complex conjunctive predicate is selected. Predicate complexity can be considered, for instance, from high to low in the following order:

Predicates transformed in Transform 2; example: (country !=['CANADA', 'USA'])

Predicates transformed in Transform 1; example: (state=['CA', 'NV', 'MA'])

Simple Predicates; example: (age>25)

If multiple conjunctive predicates of a predicate statement have the same highest complexity, then one can be selected at random. The selected predicate for each variable is added to the matrix. For instance, each row in the matrix corresponds with a predicate statement and is identified by a predicate statement identifier and each column corresponds with a variable. The selected predicate for a variable in a predicate is added to the cell matched by predicate identifier: variable as row:column respectively. As an optimization, if the selected predicate is a phantom value predicate, then the cell in the matrix is changed to true. Additionally, the selected predicate removed from the original predicate statement is replaced by the truth value "true." As an example to illustrate:

$pe_i$: (A=$a_1$) AND (B=$b_1$ OR C=$c_1$) AND (B=Ø) AND (C=Ø)

$pe_i$: true AND (B=$b_1$ OR C=$c_1$) AND true AND true

Since the removed conjunctive predicates are replaced in this step by true. The resultant expression is equivalent to:

⇒$pe_i$: True AND (B=$b_1$ OR C=$c_1$)

As an optimization, Transform 3, in which conjunctive predicates are added with a phantom value (variable=Ø) for variables that don't have conjunctive predicates in predicate statements, can be omitted. Instead, the truth value "true" can be identified in the matrix for any variable that does not have a conjunctive predicate in a predicate statement.

Transform 5:

Each predicate statement $pe_i$ is modified with an addition of a new conjunctive predicate (CJ=$pe_i$), where CJ is a new variable dimension taking values from the set PE and $R^{CJ}$=PE={$pe_1$, $pe_2$ . . . }. The newly introduced predicate (CJ=$pe_i$) is not added to matrix. As an example to illustrate:

$pe_i$: True AND (B=$b_1$ OR C=$c_1$)⇒

$pe_i$: True AND (B=$b_1$ OR C=$c_1$) AND (CJ=$pe_i$)

The following discussions provides a specific example of transforms applied to extract conjunctive predicates to form a matrix and reduced predicate statements for the following predicate statement set, PE={pe0, pe1, pe2, pe3}, that includes the variables={category, rtb, metro, url_term}:

$pe_0$:(category="iab-51" AND rtb!=4)

$pe_1$:(category="iab-79" AND (metro="new york" OR metro="phoneix" OR rtb=5)

$pe_2$:((rtb=1 OR rtb=2) AND (url_term="cooking" OR url_term="finance" OR url_term="sports")

$pe_3$:((metro='sjc' OR metro='slc') AND category !="iab-13" AND category !="iab-80")

The conjunctive predicates present in the original predicate statements are marked as bold above. Applying transform 1 results in the following transformed predicate statements in which conjunctive predicates are bolded:

$pe_0$:(category="iab-51" AND rtb!=4)

$pe_1$:(category="iab-79" AND (metro=["new York","phoneix"] OR rtb=5)

$pe_2$:(rtb=[1,2] AND url_term=["cooking","finance","sports"])

pe₃:(metro=['sjc','slc'] AND category !="iab-13" AND category !="iab-80")

Applying transform 2 results in the following transformed predicate statements, in which conjunctive predicates are bolded:

pe₀:(category="iab-51" AND rtb!=4)
pe₁:(category="iab-79" AND (metro=["new York,"phoneix"] OR rtb=5))
pe₂:(rtb=[1,2] AND url_term=["cooking","finance","sports"])
pe₃:(metro=['sjc','slc'] AND category !=["iab-13","iab-80"])

Applying transform 3 results in the following transformed predicate statements, in which conjunctive predicates are bolded:

pe₀:(category="iab-51" AND rtb!=4 AND url_term=Ø AND metro=Ø)
pe₁: (category="iab-79" AND (metro=["new York,"phoneix"] OR rtb=5) AND url_term=Ø AND rtb=Ø AND metro=Ø)
pe₂:(rtb=[1,2] AND url_term=["cooking","finance","sports"] AND metro=Ø AND category=Ø)
pe₃:(metro=['sjc','slc'] AND category !=["iab-13","iab-80"] AND url_term=Ø AND rtb=Ø)

Applying transform 4 results in the following matrix and reduced predicate statements:

Example Matrix

|  | category | rtb | metro | url_term |
|---|---|---|---|---|
| pe₀ | category="iab-51" | rtb!=4 | metro=Ø | url_term=Ø |
| pe₁ | category="iab-79" | rtb=Ø | metro=Ø | url_term=Ø |
| pe₂ | category=Ø | rtb=[1,2] | metro=Ø | url_term=["cooking","finance","sports"] |
| pe₃ | category != ["iab-13","iab-80"] | rtb=Ø | metro=['sjc','slc'] | url_term=Ø | pe₀:(true AND true AND true AND true)
pe₁:(true AND (metro=["new York,"phoneix"] OR rtb=5) AND true AND true AND true)
pe₂:(true AND true AND true AND true)
pe₃:(true AND true AND true AND true)

Applying transform 5 results in the following matrix and reduced predicate statements:

Example Matrix

|  | category | rtb | metro | url_term |
|---|---|---|---|---|
| pe₀ | category="iab-51" | rtb!=4 | true | true |
| pe₁ | category="iab-79" | true | true | true |
| pe₂ | true | rtb=[1,2] | true | url_term=["cooking","finance","sports"] |
| pe₃ | category != ["iab-13","iab-80"] | true | metro=['sjc','slc'] | true | pe₀:(CJ = 0)
pe₁:(CJ = 1 AND (metro=["new York,"phoneix"] OR rtb=5))
pe₂:(CJ = 2)
pe₃:(CJ = 3)

Figure 7:
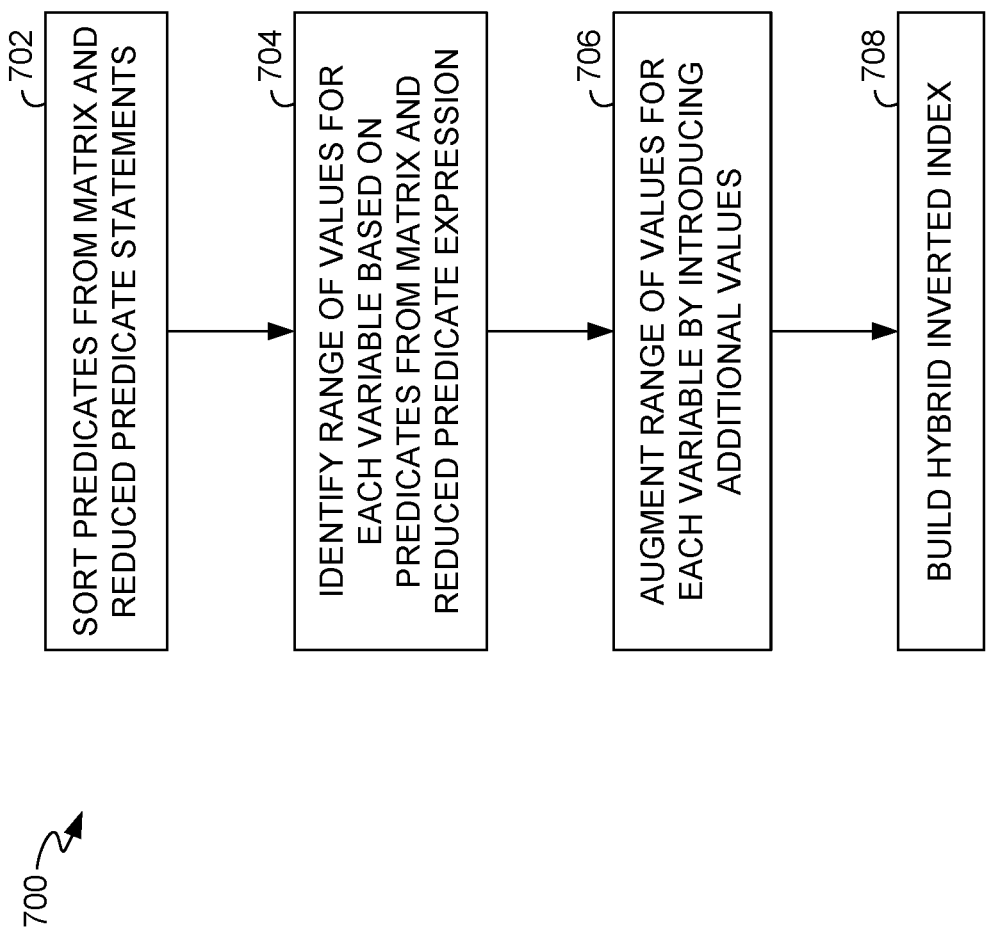
FIG. 7 is a flow diagram showing a method for generating a hybrid inverted index of predicates from a matrix and set of reduced predicate statements generated from a collection of predicate statements in accordance with some implementations of the present disclosure.

With reference now to FIG. 7, a flow diagram is provided that illustrates a method 700 for generating a hybrid inverted index of predicates from a matrix and set of reduced predicate statements generated from a collection of predicate statements (e.g., using the method 500 of FIG. 5). The method 700 may be performed, for instance, by the indexing module 106 of FIG. 1. In accordance with some configurations, the hybrid inverted indexes are generated to handle three types of predicate values: non-metric discreet values (e.g., string, character, Boolean, etc.); metric discreet values (e.g., integer); and metric continuous values (e.g., real number). Additionally, some configurations generate hybrid inverted indexes to handle different types of comparison operators, including <, <=, =, !=, >, and >=, such that the hybrid inverted indexes are operator aware.

As shown at block 702, predicates from the matrix and set of reduced predicate statements are sorted by their respective variables. In the present description, the term "dimension" is used interchangeably with variable. Accordingly, the dimension for variable A is denoted as $d^A$. D is used to denote the set of all dimensions such that, $D=\{d^A, d^B, d^C \ldots\}$.

For each variable (i.e., dimension $d^K$), all the predicate values (i.e., RHS values) are collected in a set, as shown at block 704. This set is referred as the range of values for that dimension $d^K$, denoted as $R^K$. In cases in which Transform 1 discussed above was applied such that multiple disjunctions from a common variable were consolidated as a single predicate, the transformed predicate is handled disjunctively during indexing. For instance, for the transformed predicate, state=['CA', 'NV', 'MA'], three values 'CA', 'NV', and 'MA' are each added to the range of values for the variable "state", and the transformed predicate would be indexed for each of those values.

To handle input data with values for variables outside of the range of predicate values indexed for each variable, augmentation is employed to introduce additional values to the range of predicate values for variables, as shown at block 706. These additional values can be denoted by special symbols. For instance, to handle values for non-metric variables that do not belong to the range of predicate values for a variable, a special value, denoted herein by symbol θ, is added to the Range $R^K$. At the evaluation time, the missing variable assignment value(s) are augmented with a single symbol $\theta$. Thus, the assignment $\{A=\{\theta\}\}$ matches the predicate $(A \neq v_1)$.

In addition, to handle the variable assignment of a value for a metric attribute that doesn't belong to the range of predicate values, two special values are added, denoted as $\theta_{LOW}$ and $\theta_{HIGH}$, to the Range $R^K$, such that: $\forall (a_i)$, $a_i \in R^K \Rightarrow \theta_{LOW} < a_i < \theta_{HIGH}$. At the evaluation time, the missing value(s) are handled by augmenting the assignment with one or two additional new values. If the original assigned value v is lower than the range of values, then it is replaced with $\theta_{LOW}$. If the original assigned value v is higher than the range of values, then it is replaced with $\theta_{HIGH}$. Otherwise if the original assigned value v is not in the range of values then it is replaced with two values: ceiling(v) immediate higher value in $R^K$; and floor(v) immediate lower value in $R^K$.

In accordance with some configurations, wildcard matching is provided using a special value, denoted herein by symbol *, for example (A=*). In this case, any value assignment to feature A, $A=\{a_i\}$ where $a_i \in d^A$ is considered a match, in general the index matches the predicate (A=*) with any non-empty attribute assignment.

Some configurations also support the converse of wildcard match as the predicate $(A \neq *)$, where the index matches an empty variable assignment with this predicate. As a notational convenience, a value for empty assignment is denoted herein with symbol $\psi$. Thus, the assignment $\{A=\{\psi\}\}$ matches the predicate $(A \neq *)$. The value of * is introduced as a reserved value for all dimensions and is used in building index of wildcard and wildcard-negation predicates.

To handle null assignment, some embodiments add a new value $\psi$ to the range of values. This value is used for indexing. At the lookup time, if a variable has no assignment, then the assignment is augmented with $\psi$. For example, AS={state={ }} is augmented as AS={state={$\psi$}}. This assignment matches the predicate (state$\neq$'CA') or (state !=*).

As shown at block 708, a hybrid inverted index is generated over the range of values for each variable. For each variable, the range of values includes the predicate values for predicates containing the variable and the additional values added by augmentation. The hybrid inverted index can be built using efficient data structures for maps and sets. For example, the hybrid inverted index can be built using R-B trees. The hybrid inverted index for a given variable is generated with two sets of predicates for each value, the two sets collectively referred to herein as a composite set (Cset).

The first set, referred to herein as a bitset (BS), identifies each predicate from the matrix that evaluates to true for the given value for the corresponding variable. In some configurations, the bitset is a bitstring in which each bit position corresponds with a row from the matrix. A bit for a particular bit position is set to one if the predicate in the row corresponding with that bit position evaluates to true for that value.

The second set, referred to herein as a predicate set (PS), identifies each predicate from the reduced predicate statements that evaluates to true for the given value for the corresponding variable. Each predicate can be identified in the hybrid inverted index using a predicate identifier, which may be a combination of a predicate statement identifier and node identifier. In some configurations, the predicates in predicate set may be ordered based on their predicate identifiers.

The hybrid inverted index can include three distinct hybrid maps to handle different operators, as shown below. For non-metric data only $H^A$ is built, while for metric data all three $H^A$, $H^A_{LOW}$, and $H^A_{HIGH}$ are built.

a. $H^A$: Map over values of set $R^A \cup \{\theta\}$ to handle equality and inequality operators. $\forall (^A p_i), \forall (v_i)|^A p_i \in H^A[v_i] \rightarrow ^A p_i.\text{eval}(v_i)=\text{true}$ &&
   ($^A p_i$.operator='='||$^A p_i$.operator='!=')

b. $H^A_{LOW}$: Map over values of set $R^A \cup \{\theta_{LOW}\}$ to handle < operator, operator $\leq$ is treated as a disjunction of < and = operators. Following criteria is met by the index: $\forall (^A p_i), \forall (v_i)|^A p_i \in H^A_{LOW}[v_i] \rightarrow ^A p_i.\text{eval}(v_i)=\text{true}$ &&
   ($^A p_i$.operator='<'||$^A p_i$.operator='$\leq$')

c. $H^A_{HIGH}$: Map over values of set $R^A \cup \{\theta_{HIGH}\}$ to handle > operator, operator $\geq$ is treated as a disjunction of > and = operators. Following criteria is met by the index: $\forall (^A p_i), \forall (v_i)|^A p_i \in H^A_{HIGH}[v_i] \rightarrow ^A p_i.\text{eval}(v_i)=\text{true}$ &&
   ($^A p_i$.operator='>'||$^A p_i$.operator='$\geq$')

Pseudocode for indexing methods in accordance with some configurations is provided in FIGS. 8 and 9.

Querying Data Using Hybrid Inverted Index

Figure 10:
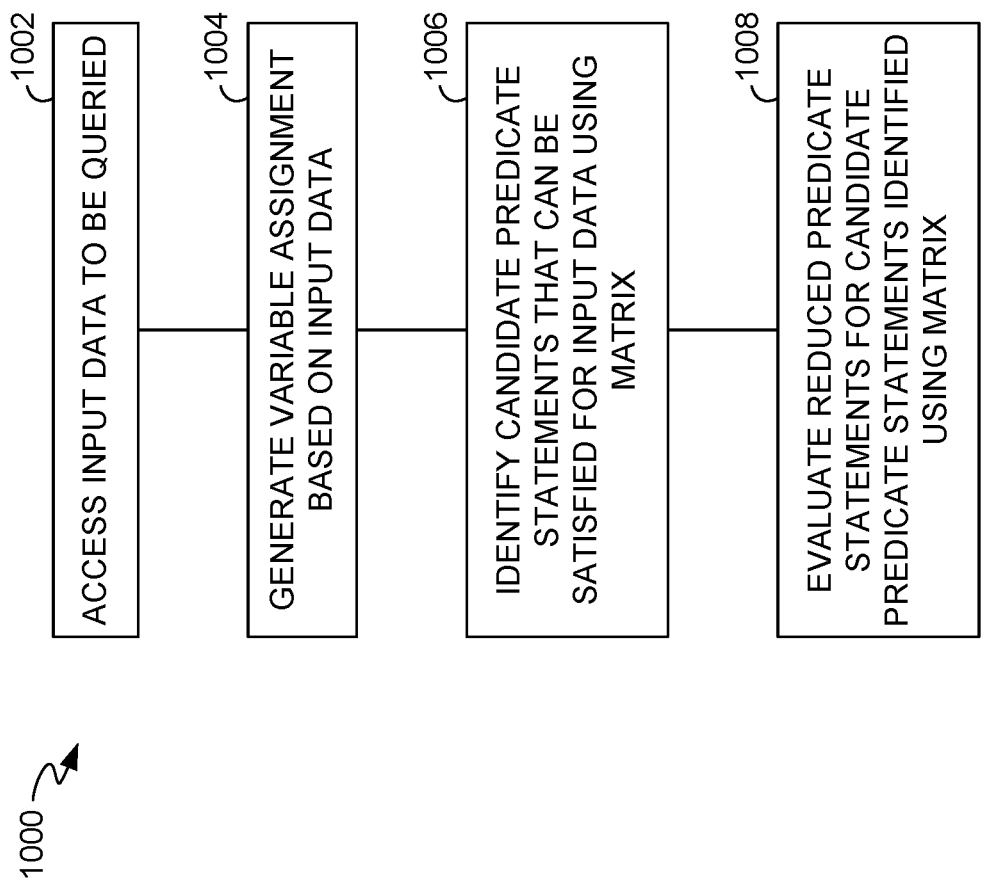
FIG. 10 is a flow diagram showing another method for querying input data by evaluating predicate statements using a hybrid inverted index generated from a collection of predicate statements in accordance with some implementations of the present disclosure.

Referring next to FIG. 10, a flow diagram is provided that illustrates a method 1000 for querying input data by evaluating predicate statements using a hybrid inverted index generated from a collection of predicate statements. The method 1000 may be performed, for instance, by the evaluation module 108 of FIG. 1. As shown at block 1002, input data to be queried is accessed. The input data includes values for any number of variables.

A variable assignment is generated based on the input data, as shown at block 1004. The evaluation of a set of predicate statements is performed using a set of variable assignments, which identifies values for particular variables based on the input data. For instance, AS={state={'CA'}, rtb={5,7}} could be used to denote a variable assignment for input data where the variable "state" has one value assigned (i.e., 'CA') and variable "rtb" has two values assigned (i.e., 5 and 7). $AS^{var}$ is also used herein to represent assignment for a single variable, for example, $AS^{state}$={state={'CA'}}.

Variable assignment for input data may also include augmenting the assignment with additional values for variables. The variable assignment augmentation may include:

1. If the variable assignment for a variable is empty, then it is augmented by $\psi$.
   a. $AS^{var}$={var={ }}$\Rightarrow AS^{var}$={var={$\psi$}}
2. If the variable takes value from non-metric space and the variable value doesn't belong in the range of values, then the variable assignment is augmented with $\theta$ and the original value is removed as an optimization.
   a. $AS^{var}$={var={v}},v$\in R^{var}$ $\Rightarrow$
   b. $AS^{var}$={var={v, $\theta$}}$\Rightarrow$
   c. $AS^{var}$={var={$\theta$}}
3. If the variable takes value from metric space and the variable value doesn't belong in the range of values, then the variable assignment is augmented with ceiling (v) as shown below:
   a. ceiling(v)=$\lceil v \rceil$=min{$a_i \in \{R^A, \theta_{HIGH}\}$, $a_i > v$}
   b. $AS^{var}$={var={v}}$\Rightarrow AS^{var}$={var={v, $\lceil v \rceil$}}
4. If the variable takes value from metric space and the variable value doesn't belong in the range of values, then the variable assignment is additionally augmented with floor(v) and as an optimization the value is removed from the assignment, as shown below:
   a. floor(v)=$\lfloor v \rfloor$=max{$a_i \in \{R^A, \theta_{LOW}\}$, $a_i < v$}
   b. $AS^{attr}$={attr={v, $\lceil v \rceil$}}$\Rightarrow$
   c. $AS^{attr}$={attr={v, $\lceil v \rceil$, $\lfloor v \rfloor$}}$\Rightarrow$
   d. $AS^{attr}$={attr={$\lceil v \rceil$,$\lfloor v \rfloor$}}

5. When the reduced complexity predicate statements are evaluated (as discussed below), the assignment AS is further augmented with $AS^{CJ}$, this augmentation adds all predicate statements satisfiable by the matrix.
   a. AS={$AS^A$, $AS^B$, $AS^C$ ...}⇒AS={$AS^A$, $AS^B$, $AS^C$ ... $AS^{CJ}$}

Using the variable assignments, candidate predicate statements that can potentially be satisfied by the input data are identified from the matrix, as shown at block 1006. For instance, in cases in which the original predicate statements were placed in CNF, each row in the matrix includes predicates in each column that are conjunctive with each other, such that a predicate statement is identified as a candidate predicate from the matrix when each column is true for the input data. As illustrated in the Example Matrix above, a row for a given predicate statement may have some columns containing a predicate statement, while other columns are marked as true as there is no conjunctive predicate for the variable of each of those columns. For instance, for the predicate statement, $pe_0$, in the Example Matrix, a predicate is identified for the variables "category" and "rtb" while true is indicated for the variables "metro" and "url_term". Thus, the predicate statement $pe_0$ is identified as a candidate predicate statement if the predicates in each of the first two columns are evaluated to true for the input data. Any predicate statements that cannot be satisfied based on the matrix can be removed from further consideration.

The identification of candidate predicate statements from the matrix may include performing a lookup in the hybrid inverted index to identify predicates from the matrix mapped to values from the variable assignment for the input data. In particular, the values from the variable assignment (including augmented values) are used as keys to retrieve the bitset for each value from the hybrid inverted index. Identified predicates are evaluated as true in the matrix to identify candidate predicate statements (e.g., when all columns are true for a row corresponding to a predicate statement).

The reduced predicate statement for each candidate predicate statement identified from the matrix is evaluated for the input data, as shown at block 1008. The reduced predicate statements can be evaluated by performing a lookup in the hybrid inverted index to identify predicates from the reduced predicate statements mapped to values from the variable assignment for the input data. In particular, the values from the variable assignment (including augmented values) are used as keys to retrieve the predicate set for each value from the hybrid inverted index. Identified predicates are evaluated as true in the reduced predicate statement for each candidate predicate statement. In some configurations, the process of evaluating a reduced predicate statement at block 1008 is performed using a bit string for the reduced predicate statement. However, it should be understood that the evaluation of predicate statements can be performed without the use of bit strings in other configurations. For each reduced predicate statement that evaluates to true based on the input data, the corresponding predicate statement is marked as true, thereby providing a result set of predicate statements that evaluate to true for the input data.

It should be noted that in some configurations, a single lookup can be performed on the hybrid inverted index for each variable assignment to retrieve the bitset and predicate set for the variable assignment. In other configurations, a separate lookup can be performed on the hybrid inverted index for the bitset and predicate set for a variable assignment.

Pseudocode for an evaluation method in accordance with some configurations is provided in FIG. 11.

The following provides an example to illustrate evaluation of a matrix and reduced predicate statement using a hybrid inverted index. The collection of predicate statements, PE={$pe_0$, $pe_1$, $pe_2$, $pe_3$}, includes variables={A, B, C, D}:

$pe_0$: (A=1) AND (B=$b_1$ OR C=$c_1$) AND (D≠$d_1$)
$pe_1$: (A=8) AND (D=$d_1$ OR D=$d_2$)
$pe_2$: (B=$b_2$) AND (C=$c_1$ OR D=*)
$pe_3$: (A=10) AND (C≠*)

Transformation of the predicate statements into matrix and reduced statement form (e.g., using the method 500 of FIG. 5) results in the following:

Part 1: Matrix

|  | A | B | C | D |
|---|---|---|---|---|
| $pe_0$ | A = 1 | B = ∅ | C = ∅ | D != $d_1$ |
| $pe_1$ | A = 8 | B = ∅ | C = ∅ | D = [$d_1$, $d_2$] |
| $pe_2$ | A = ∅ | B = b2 | C = ∅ | D = ∅ |
| $pe_3$ | A = 10 | B = ∅ | C != * | D = ∅ |

Part 2: Reduced Predicate Statement $pe_0$: (B=$b_1$ OR C=$c_1$)
$pe_1$: true
$pe_2$: (C=$c_1$ OR D=*)
$pe_3$: true Hybrid inverted indexes for each of the variables {A, B, C, D} are generated (e.g., using the method 700 of FIG. 7). The hybrid inverted index for variable A, $H^A$, is generated using $R^A$={1, 8, 10}:

| | $H^A$.CSet | | | $H^A_{LOW}$.CSet | | | $H^A_{HIGH}$.CSet | |
|---|---|---|---|---|---|---|---|---|
| Key | BS | PS | Key | BS | PS | Key | | |
| 1 | {$pe_0$, $pe_2$} | { } | $\theta_{LOW}$ | { } | { } | 1 | { } | { } |
| 8 | {$pe_1$, $pe_2$} | { } | 1 | { } | { } | 8 | { } | { } |
| 10 | {$pe_3$, $pe_2$} | { } | 8 | { } | { } | 10 | { } | { } |
| θ | {$pe_2$} | { } | 10 | { } | { } | $\theta^{HIGH}$ | { } | { } |
| * | {$pe_2$} | { } | | | | | | |
| Ψ | {$pe_2$} | { } | | | | | | |

The hybrid inverted index for variable B, $H^B$, is generated using $R^B$={$b_1$, $b_2$}:

| Value | BS | PS |
|---|---|---|
| $b_1$ | {$pe_0$, $pe_1$, $pe_3$} | {(B = $b_1$)/$pe_0$} |
| $b_2$ | {$pe_2$, $pe_0$, $pe_1$, $pe_3$} | { } |
| θ | { $pe_0$, $pe_1$, $pe_3$} | { } |
| * | { $pe_0$, $pe_1$, $pe_3$} | { } |
| Ψ | { $pe_0$, $pe_1$, $pe_3$} | { } |

The hybrid inverted index for variable C, $H^C$, is generated using $R^C$={$c_1$, $c_2$}:

| Value | BS | PS |
|---|---|---|
| $c_1$ | {$pe_0$, $pe_1$, $pe_2$} | {(C = $c_1$)/$pe_0$, {(C = $c_1$)/$pe_2$} |
| $c_2$ | {$pe_0$, $pe_1$, $pe_2$} | { } |
| θ | {$pe_0$, $pe_1$, $pe_2$} | { } |
| * | {$pe_0$, $pe_1$, $pe_2$} | { } |
| Ψ | { $pe_0$, $pe_1$, $pe_2$, $pe_3$} | { } |

The hybrid inverted index for variable D, $H^D$, is generated using $R^D=\{d_1, d_2\}$:

| Value | BS | PS |
|---|---|---|
| $d_1$ | $\{pe_1, pe_2, pe_3\}$ | $\{(D = [d_1,d_2])/pe_1\}$ |
| $d_2$ | $\{pe_0, pe_1, pe_2, pe_3\}$ | { } |
| $\theta$ | $\{pe_0, pe_2, pe_3\}$ | { } |
| * | $\{pe_2, pe_3\}$ | $\{(D = *)/pe_2\}$ |
| $\Psi$ | $\{pe_0, pe_2, pe_3\}$ | { } |

Based on this collection of predicate statements, a default true set is pre-computed as: defaultTrue=$\{pe_1, pe_3\}$ Suppose input data is received that includes the following variable assignment for evaluation: AS=$\{\{A=\{4\}\}, \{B=\{b2\}\}, \{D=\{d2\}\}\}$. Augmentation of the variable assignments includes:

$AS^A=\{A=\{\lfloor 1 \rfloor, \lceil 8 \rceil, \theta, *\}\}$
$AS^B=\{B=\{b2,*\}\}$
$AS^C=\{C=\{\Psi\}\}$
$AS^D=\{D=\{d2,*\}\}$ Given this attribute assignment, a evaluation of the matrix provides a satisfiableList, which includes predicate statements that are satisfiable based on the matrix (i.e., candidate predicate statements), as shown below. A lookup may be performed on the hybrid inverted index to identify predicates based on the attribute assignment.

satisfiableList=$(H^A[\theta].BS \cup H^A(*).BS \cup H^A_{LOW}[1]$
$.BS \cup H^A_{HIGH}[8].BS) \cap$
$H^B(b2).BS \cup H^B(*).BS \cap H^C(\Psi).BS \cap (H^D(d_2).BS \cup H^D(*).BS)$
$\Rightarrow (\{pe_2\} \cup \{pe_2\} \cup \{\ \} \cup \{\ \}) \cap (\{pe_2\} \cup \{pe_0, pe_1, pe_3\})$
$\cap \{pe_0, pe_1, pe_2, pe_3\}$
$\cap (\{pe_0, pe_1, pe_2, pe_3\} \cup \{pe_2, pe_3\})$
$\Rightarrow \{pe_2\}$ In some instances, a determination can be made if any predicate statement is satisfied based on reduced predicate statements whose default it true ("defaultTrue") and candidate predicate statements identified from the matrix ("satisfiableList"):

satisfied=defaultTrue $\cap$ satisfiableList=$\{pe_1, pe_3\} \cap \{pe_2\}=\{pe\}$ Predicate statements to be evaluated as follows:

$= ((H^A[AS^A].PS \cup H^B[AS^B].PS \cup H^C[AS^A].PS \cup H^D[AS^D].PS) \cap satisfiableList) \cup$
satisfied $= ((H^A[\{1,8,\theta,\ *\}].PS \cup H^B[\{\Psi\}].PS \cup H^C[\{\Psi\}].PS \cup H^D[\{d_2,\ *\}].PS) \cap satisfiableList) \cup$
satisfied $= ((\{\ \} \cup \{\ \} \cup \{\ \} \cup \{(pe_2)\}) \cap \{pe_2\}) \cup \{\ \}$ $= \{pe_2\}$ Evaluation of the $pe_2$ predicate statement is performed using a bit string as follows:

$pe_2$=true AND (C=$c_1$ OR D:*=*)$\Rightarrow$01000
$\Rightarrow pe_2$: true AND (C=c1 OR true)$\Rightarrow$01001$\Rightarrow$
01101$\Rightarrow$11101
$\Rightarrow$true
satisfied=$\{pe_2\}$ Exemplary Operating Environment Having described implementations of the present disclosure, an exemplary operating environment in which embodiments of the present invention may be implemented is described below in order to provide a general context for various aspects of the present disclosure. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1200. The computing device 1200 may be equipped with depth cameras, such as, stereoscopic camera systems, infrared camera systems, RGB camera systems, and combinations of these for gesture detection and recognition. Additionally, the computing device 1200 may be equipped with accelerometers or gyroscopes that enable detection of motion.

As described above, implementations of the present disclosure relate to capturing structural modifications made to a person's face in a reference image and automatically applying the structural modification to the person's face in other images. The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
   receiving a plurality of queries, each query comprising a predicate statement;
   applying one or more transforms to each predicate statement from the plurality of queries to generate a matrix and a set of reduced predicate statements, each row of the matrix corresponding to a respective predicate statement and including conjunctive predicates or disjunctive predicates from the respective predicate statement, each reduced predicate statement from the set of reduced predicate statements corresponding to a respective predicate statement and generated by removing the conjunctive predicates or disjunctive predicates added to the matrix from the respective predicate statement;
   generating a hybrid inverted index that includes a mapping of predicate values for variables to predicates from the matrix and the set of reduced predicate statements;
   storing the hybrid inverted index, matrix, and set of reduced predicate statements, for use in evaluating the plurality of queries;
   receiving input data; and
   determining one or more queries satisfied by the input data by:
      identifying one or more predicates satisfied by the input data using the hybrid inverted index,
      identifying one or more candidate predicate statements from the matrix based on the one or more predicates satisfied by the input data, and
      identifying one or more predicate statements satisfied by the input data by evaluating the reduced predicate statement for each of the one or more candidate predicate statements.

2. The one or more computer storage media of claim 1, wherein the operations further comprise:
   converting one or more of the predicate statements to conjunctive normal form or disjunctive normal form.

3. The one or more computer storage media of claim 1, wherein applying the one or more transforms to the predicate statements comprises:
for a first predicate statement, extracting one or more conjunctive predicates or one or more disjunctive predicates from the first predicate statement to provide a first reduced predicate statement for the first predicate statement; and
generating the matrix by, including the one or more conjunctive predicates or the one or more disjunctive predicates extracted from the first predicate statement in a row of the matrix corresponding with the first predicate statement, wherein the matrix comprises a table in which each column corresponds with a variable from a plurality of variables included in the predicate statements.

4. The one or more computer storage media of claim 1, wherein applying the one or more transforms to the predicate statements comprises:
identifying a first predicate statement that includes multiple disjunctions for a first variable; and
consolidating the multiple disjunctions as a single predicate and removing the multiple disjunctions from the first predicate statement.

5. The one or more computer storage media of claim 1, wherein applying the one or more transforms to the predicate statements comprises:
identifying a first predicate statement that includes multiple predicates for a first variable that include an inequality operator; and
consolidating the multiple predicates as a single predicate with an inequality operator.

6. The one or more computer storage media of claim 1, wherein applying the one or more transforms to the predicate statements comprises:
identifying a first predicate statement that does not have a conjunctive predicate for a first variable; and
augmenting the first predicate statement with a conjunctive predicate for the first variable that includes an equality operator and a phantom value.

7. The one or more computer storage media of claim 1, wherein generating the matrix comprises:
adding, for each predicate statement, a true value to the matrix for any variable not having a conjunctive predicate or a disjunctive predicate in the predicate statement.

8. The one or more computer storage media of claim 1, wherein generating the hybrid inverted index comprises:
sorting predicates from the matrix and the set of reduced predicate statements by variable;
for each variable:
identifying a range of values for the variable based on predicates containing the variable;
augmenting the range of values for the variable by introducing one or more additional values; and
generating the hybrid inverted index using the augmented range of values for each variable and mapping each predicate from the matrix and the set of reduced predicate statements to one or more values in the augmented range of values for each variable.

9. The one or more computer storage media of claim 8, wherein augmenting the range of values for a non-metric variable comprises:
adding a special value for the non-metric variable to handle data containing a value for the non-metric variable that is outside the range of values for the non-metric variable.

10. The one or more computer storage media of claim 8, wherein augmenting the range of values for a metric variable comprises:
adding a special value for the metric variable to handle equality and inequality operators to handle data containing a value for the metric variable that is outside the range of predicate values for the metric variable.

11. The one or more computer storage media of claim 8, wherein augmenting the range of values for a metric variable comprises:
adding a special value for the metric variable to handle < and <= operators.

12. The one or more computer storage media of claim 8, wherein augmenting the range of values for a metric variable comprises:
adding a special value for the metric variable to handle > and >= operators.

13. The one or more computer storage media of claim 1, wherein:
identifying the one or more predicates satisfied by the input data using the hybrid inverted index comprises identifying a value for each of one or more variables based on the input data and performing a lookup in the hybrid inverted index to identify predicates from the matrix and the set of reduced predicate statements indexed for each value;
identifying the one or more candidate predicate statements from the matrix based on the one or more predicates satisfied by the input data comprises identifying one or more predicate statements that can be satisfied for the input data using the matrix by treating each predicate from the matrix identified from the hybrid inverted index as true; and
identifying the one or more predicate statements satisfied by the input data by evaluating the reduced predicate statement for each of the one or more candidate predicate statements comprises evaluating the reduced predicate statement for each of the one or more candidate predicate statements by treating each predicate from the reduced predicate statements identified from the hybrid inverted index as true.

14. The one or more computer storage media of claim 13, wherein identifying the value for each of one or more variables based on the input data comprises:
generating a variable assignment with values assigned to variables from the input data; and
augmenting the variable assignment with one or more additional values for variables.

15. A computerized method comprising:
receiving data with a value for each of one or more variables; and
evaluating a plurality of queries to identify one or more queries satisfied by the data by:
performing a lookup on a hybrid inverted index to identify predicates mapped to the value for each of the one or more variables, the predicates from a matrix and a set of reduced predicate statements generated from a set of predicate statements, each predicate statement from the set of predicate statements corresponding to a respective query from the plurality of queries;
identifying one or more candidate predicate statements that can be satisfied for the input data using the matrix by treating each predicate from the matrix identified from the hybrid inverted index as true; and
determining the one or more queries satisfied by the data by evaluating the reduced predicate statement for each of the one or more candidate predicate statements by treating each predicate from the reduced predicate statements identified from the hybrid inverted index as true.

16. The computerized method of claim 15, wherein the method further comprises:
augmenting the value for each of the one or more variables with one or more additional values for variables; and
wherein the lookup on the hybrid inverted index also identifies predicates mapped to the one more additional values for variables.

17. The computerized method of claim 15, wherein the lookup on the hybrid inverted index comprises a first lookup to identify predicates from the matrix and a second lookup to identify predicates from the set of reduced predicate statements.

18. The computerized method of claim 15, wherein the method further comprises generating the matrix and the set of reduced predicate statements by:
for each of at least a portion of the predicate statements, extracting one or more conjunctive predicates or one or more disjunctive predicates from the predicate statement to provide a reduced predicate statement for the predicate statement; and
generating the matrix by, for each of the at least a portion of the predicate statements, including the one or more conjunctive predicates or the one or more disjunctive predicates extracted from the predicate statement in a row of the matrix corresponding with the predicate statement, wherein the matrix comprises a table in which each row corresponds with a predicate statement from the predicate statements and each column corresponds with a variable from a plurality of variables included in the predicate statements.

19. A computer system comprising:
one or more processors; and
one or more computer storage media storing computer useable instructions that, when used by the one or more processors, cause the one or more processors to perform operations comprising:
for a plurality of queries in which each query comprises a predicate statement, applying one or more transforms to each predicate statement to generate a matrix and a set of reduced predicate statements, the matrix comprising conjunctive predicates or disjunctive predicates from each predicate statement, each reduced predicate statement corresponding to a respective predicate statement and generated by removing the conjunctive predicates or disjunctive predicates added to the matrix from the respective predicate statement;
generating a hybrid inverted index mapping predicate values for variables to predicates from the matrix and the set of reduced predicate statements that evaluate to true given the corresponding predicate values; and
determining one or more queries satisfied by input data by:
identifying one or more predicates satisfied by the input data using the hybrid inverted index,
identifying one or more candidate predicate statements from the matrix based on the one or more predicates satisfied by the input data, and
identifying one or more predicate statements satisfied by the input data by evaluating the reduced predicate statement for each of the one or more candidate predicate statements.

* * * * *